(12) United States Patent
Hermann (10) Patent No.: US 9,013,710 B2
(45) Date of Patent: Apr. 21, 2015

(54) OPTICAL POSITION-MEASURING DEVICE

(75) Inventor: Michael Hermann, Tacherting (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 354 days.

(21) Appl. No.: 13/463,438

(22) Filed: May 3, 2012

(65) Prior Publication Data

US 2012/0281238 A1    Nov. 8, 2012

(30) Foreign Application Priority Data

May 5, 2011    (DE) .......................... 10 2011 075 286

(51) Int. Cl.
*G01B 11/02*    (2006.01)
*G01D 5/347*    (2006.01)

(52) U.S. Cl.
CPC .................................. *G01D 5/34715* (2013.01)

(58) Field of Classification Search
USPC .................. 356/616–618, 401, 498
See application file for complete search history.

(56) References Cited

U.S. PATENT DOCUMENTS

| | | | | |
|---|---|---|---|---|
| 5,302,820 A | * | 4/1994 | Henshaw et al. | ........ 250/231.16 |
| 2004/0090637 A1 | * | 5/2004 | Holzapfel et al. | ............ 356/499 |
| 2007/0024865 A1 | | 2/2007 | Mitchell et al. | |
| 2008/0067333 A1 | * | 3/2008 | Holzapfel et al. | ............ 250/234 |

FOREIGN PATENT DOCUMENTS

EP    2 233 892    9/2010

OTHER PUBLICATIONS

European Extended Search Report, dated Sep. 26, 2012, issued in corresponding European Patent Application No. 12164250.8.
J. Carr, et al., "*Miniaturised optical encoder for ultra precision metrology systems*," Precision Engineering 33: 263-267 (2009).

* cited by examiner

*Primary Examiner* — Jonathan Hansen
*Assistant Examiner* — Jonathon Cook
(74) *Attorney, Agent, or Firm* — Kenyon & Kenyon LLP (57) ABSTRACT

An optical position-measuring device for detecting the relative position of two objects includes a measuring standard connected to one object, and a scanning unit connected to the other object and including a light source, one or more grating(s), and a detector system. The detector system includes a plurality of detector element groups arranged in a detection plane, via which a plurality of position-dependent, phase-shifted scanning signals is able to be generated by scanning a periodic fringe pattern that results in the detection plane, the detector elements that have in-phase scanning signals forming a group in each case. The sum of the areas and the centroid of the detector elements of a group is identical to the sum of the areas and the centroid, respectively, of the detector elements of each other group. Periodic diaphragm structures are arranged in front of the light-sensitive areas of the detector elements.

15 Claims, 7 Drawing Sheets

OPTICAL POSITION-MEASURING DEVICE

CROSS-REFERENCE TO RELATED APPLICATIONS

The present application claims priority to Application No. 10 2011 075 286.2, filed in the Federal Republic of Germany on May 5, 2011, which is expressly incorporated herein in its entirety by reference thereto.

FIELD OF THE INVENTION

The present invention relates to an optical position-measuring device.

BACKGROUND INFORMATION

Conventional position-measuring devices for measuring the position of two objects that are movable relative to each other along at least one measuring direction are made up of a measuring standard which is connected to one of the two objects, as well as a scanning unit which is connected to the other one of the two objects. The measuring standard includes an incremental graduation which extends in the measuring direction. The scanning unit has a light source, one or more grating(s), as well as a detector system. A plurality of groups of detector elements, which are disposed in a detection plane, is provided on the side of the detector system. If the two objects execute a relative movement, a plurality of position-dependent, phase-shifted scanning signals can be generated by scanning a periodic fringe pattern that results in the detection plane. The detector elements that have in-phase scanning signals form a group in each case. Four preferably rectangular detector elements are typically provided in the detector system for so-called single-field scanning for the purpose of generating four scanning signals that have an individual phase offset of 90° within one period of the fringe pattern. Such single-field scanning is considered to be advantageous even in instances where the operating conditions are less than ideal, such as when the scanned measuring standard is contaminated, inasmuch as only a slight detrimental effect is noticeable on the ideal signal shape of the scanning signals.

As the resolution of such position-measuring devices increases, the periods of the resulting fringe pattern in the detection plane become smaller and smaller. However, there are technological limits in regard to the detector elements as far as their minimally possible width is concerned. At a provided spacing of adjacent detector elements of 5 µm and a minimally possible width of a detector element of 5 µm, such conventional single field scanning is therefore no longer usable for scanning fringe pattern periods below 40 µm. Moreover, the portion of the margin capacities in relation to the total capacity of the individual detector elements increases as the detector element structures become smaller and smaller. Indicating suitable measures also for high-resolution optical position-measuring devices so as to ensure excellent signal quality even under less than optimal operating conditions constitutes a problem.

To solve this problem, it is conventional to place diaphragm structures in front of the detector system, which include periodically placed, transparent regions, whose periodicity is less than the dimensions of an individual detector element in the measuring direction. In this context, reference is made, for example, to FIGS. 2 and 3 in the publication of J. Carr et al. bearing the title "Miniaturized Optical Encoder for Ultra Precision Metrology Systems" in Precision Engineering 33 (2009), p. 263-267. However, this approach has the problem of requiring the diaphragm structures to be aligned extremely precisely in relation to the detector elements if the detector elements are small. Otherwise low quality scanning signals will result, i.e., signals having a lower modulation degree and thus lower signal amplitude. If larger detector elements are involved, on the other hand, the adjustment of the diaphragm structures is less critical. Nevertheless, under less than ideal operating conditions, good signal quality can no longer be guaranteed.

SUMMARY

Example embodiments of the present invention provide a high-resolution optical position-measuring device which ensures the best possible quality of the resulting scanning signals, even if the components are not in ideal alignment with each other in the scanning beam path or if the operating conditions are less than ideal.

An optical position-measuring device according to an example embodiment of the present invention for detecting the position of two objects which are movable relative to each other along at least one measuring direction includes a measuring standard which is connected to one of the two objects and has an incremental graduation extending in the measuring direction. Furthermore, the position-measuring device includes a scanning unit which is connected to the other one of the two objects and includes a light source, one or more grating(s), and a detector system. The detector system includes a plurality of groups of detector elements disposed in a detection plane, via which, in case of a relative movement of the two objects, a plurality of position-dependent, phase-shifted scanning signals is able to be generated by scanning a periodic fringe pattern that results in the detection plane. The detector elements having in-phase scanning signals form a group in each case. The sum of the areas of the detector elements of a group is identical to the sum of the areas of the detector elements of each other group. Furthermore, the centroid of the detector elements of a group is identical to the centroid of the detector elements of each other group. Periodic diaphragm structures are arranged in front of the light-sensitive areas of the detector elements.

Preferably, the periodic diaphragm structures include transparent and opaque areas disposed in alternation in at least the measuring direction, their periodicity being lower than the dimensions of the detector elements in the measuring direction.

In addition, it is possible that the sum of the areas of the transparent regions of the diaphragm structures assigned to a group of detector elements is identical to the sum of the areas of the transparent regions of the diaphragm structures that are assigned to each other group of detector elements, and that the centroids of the transparent regions of the diaphragm structures assigned to a group of detector elements is identical to the centroids of the transparent regions of the diaphragm structures that are assigned to each other group of detector elements.

In addition, it may be provided that the different groups of detector elements additionally have the same values of the three components of the second area sensitivity moment, and that the transparent regions of the diaphragm structures that are assigned to different groups of detector elements have the same values of the three components of the second area sensitivity moment.

Furthermore, it is possible that the different groups of detector elements additionally have the same values of all other area sensitivity moments, and the transparent regions of the diaphragm structures that are assigned to different groups of detector elements furthermore have the same values of all other area sensitivity moments.

In this context, it may be provided that the diaphragm structures are arranged as gratings on a scanning plate, and the scanning plate is disposed above the detector system in the scanning unit or that the diaphragm structures are arranged as a metallic layer having transparent regions on the detector elements.

The dimensions of the diaphragm structures in the measuring direction may be selected according to the relationship $d=1/3 \cdot P_D$ or according to the relationship $d=1/4 \cdot P_D$, d being the width of the diaphragm structures in measuring direction x, and $P_D$ being the periodicity of the transparent regions of the diaphragm structures.

Furthermore, it is possible that the diaphragm structures are provided on only a portion of the detector elements, in accordance with a weighting function.

The diaphragm structures may be present only on the particular detector elements of the detector system that jointly form an approximately square region.

Furthermore, the detector system may be arranged in the form of a sector and include a plurality of circle sectors, in which a plurality of detector elements is disposed in a plurality of circular tracks, radially adjacent to each other.

The detector system may be arranged in semicircular form, for example.

It may furthermore be provided that the detector elements of adjacent tracks that generate in-phase scanning signals are electrically connected to each other via diagonally extending contacting connections.

In addition, the detector elements of a group may be connected to downstream signal processing elements at the end edges of the sector-shaped detector systems.

The detector system may be situated adjacent to the light source in the scanning unit, and a guard diode, which surrounds the light source without gap, is situated in the detection plane.

In addition, it is possible that the geometrical configuration of the radially innermost track of the detector elements deviates from the geometrical configuration of the track that is located next to it in the radial direction.

An advantage of the high-resolution optical position-measuring device described herein is the excellent quality of the generated scanning signals, which is ensured even under less than ideal operating conditions. On the one hand, for example, the scanned measuring standard is highly impervious to potential contamination. In addition, the effect of a less than ideal installation of components in the beam path or in the scanning unit is negligible. The same can be said for a less than optimal attachment of the position-measuring device.

Furthermore, the margin capacities in the detector elements are lower, which results in a greater potential bandwidth or less noise in the scanning signals.

The measures described herein may be used both for rotary and linear position-measuring devices.

Further features and aspects of example embodiments of the present invention are described in more detail below with reference to the appended Figures.

DETAILED DESCRIPTION

Figure 1:
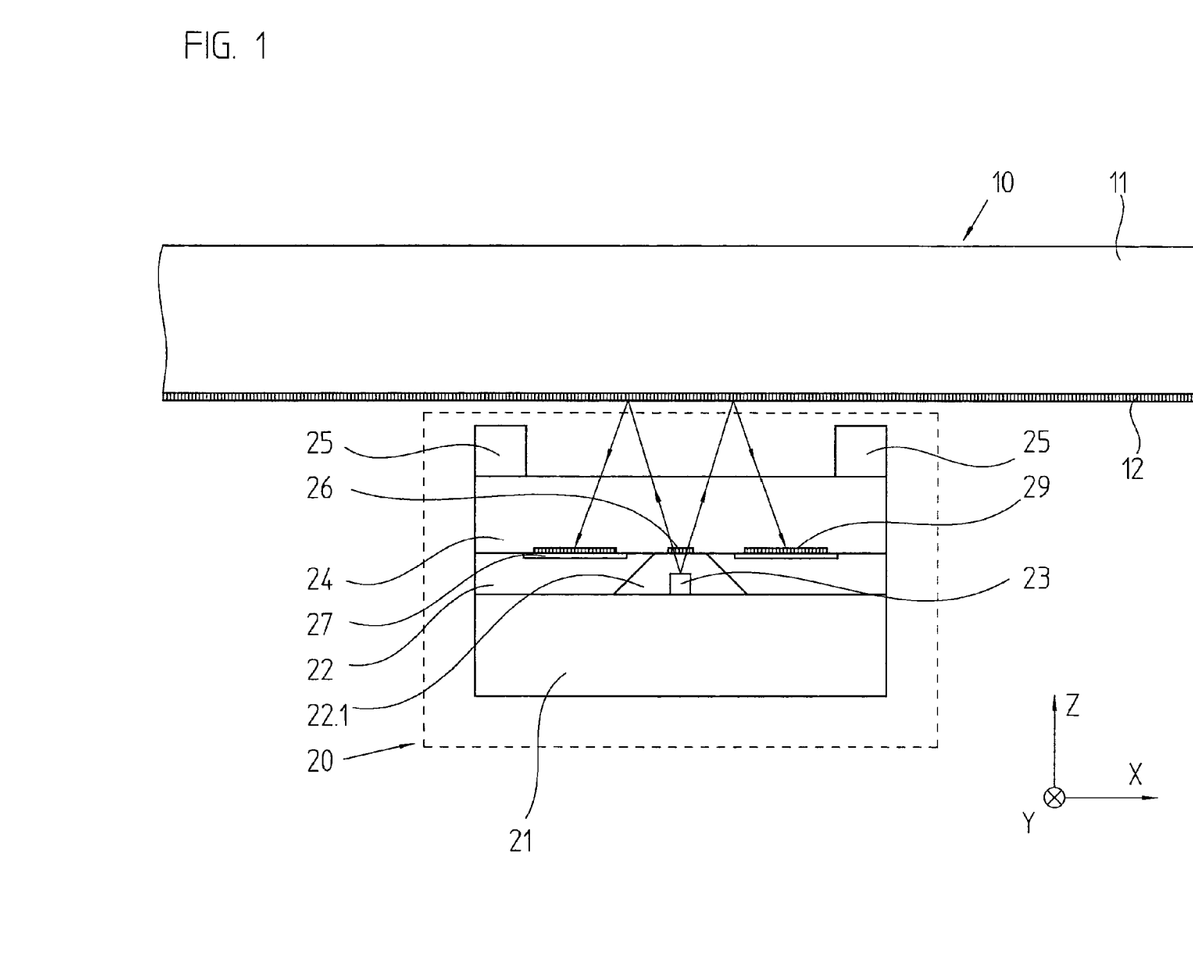
FIG. 1 schematically illustrates an optical position-measuring device according to an example embodiment of the present invention.
Figure 2:
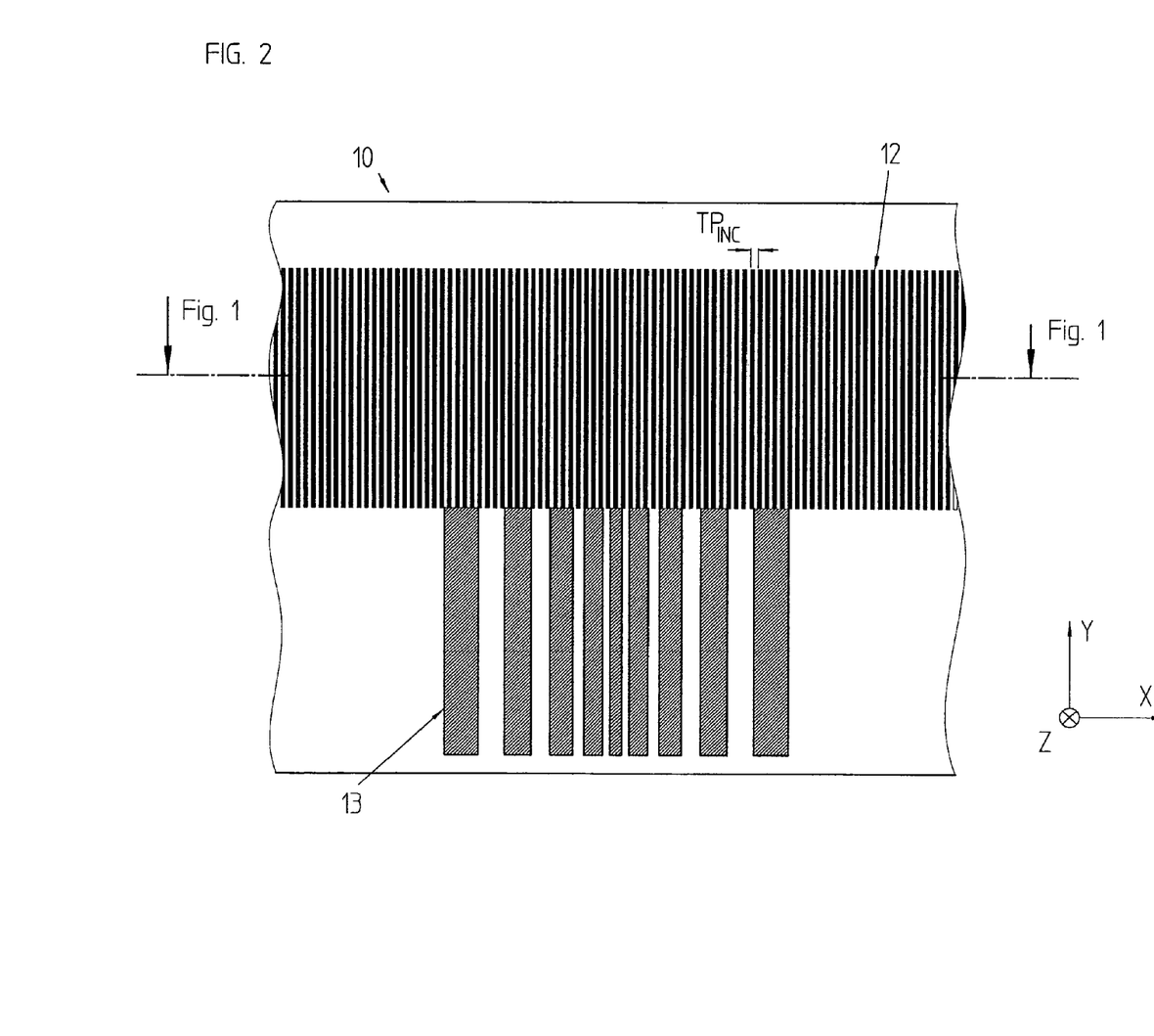
FIG. 2 is a plan view of the measuring standard of the position-measuring device illustrated in FIG. 1.
Figure 3:
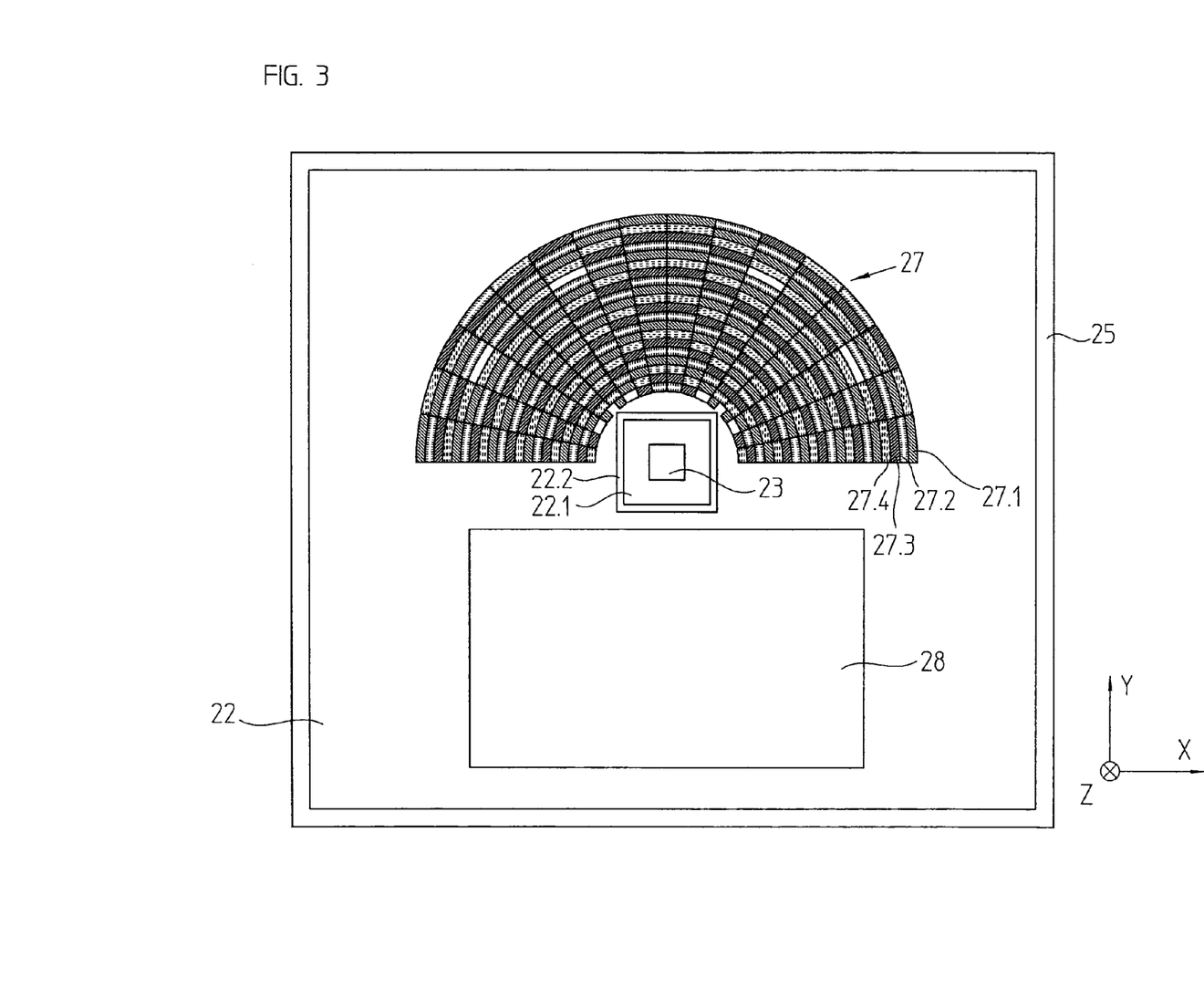
FIG. 3 is a plan view of the detector system of the position-measuring device illustrated in FIG. 1.

FIGS. 1 to 3 schematically illustrate an optical position-measuring device according to an example embodiment of the present invention, the device being configured as a reflective light system. FIG. 1 is a lateral cross-sectional view, FIG. 2 is a plan view of the measuring standard, and FIG. 3 is a plan view of the detection plane in the scanning unit.

The optical position-measuring device for detecting the position of two objects that are movable relative to each other along at least one measuring direction x includes a measuring standard 10 and a scanning unit 20. Measuring standard 10 and scanning unit 20 are connected to the two objects, which are not shown in the figures. For instance, these objects may be machine components that are movable relative to each other. If the machine components move with respect to each other, the optical position-measuring device generates positional signals, which are processed by a downstream machine control.

The Figures shows a linear position-measuring device, in other words, measuring standard 10 and scanning unit 20 are situated in a manner that allows them to move in relation to each other, along indicated linear measuring direction x.

In the present example, measuring standard 10 includes a support body 11, on which an incremental graduation 12 extending in measuring direction x is situated. Incremental graduation 12 is formed by linear graduation areas that are disposed in alternation in measuring direction x and have different phase-shifting effects, the graduation areas being illustrated by light and dark shading in FIG. 2. Therefore, the incremental graduation is implemented as phase grating and may have a phase depth of 180°. The scale division regions of incremental graduation 12 are disposed periodically in measuring direction x, at a scale division period $TP_{INC}$.

In the exemplary embodiment illustrated, an additional track having at least one reference marking 13 is provided on the side of measuring standard 10 in the indicated y-direction, adjacent to the track having incremental graduation 12, as illustrated in FIG. 2. Reference marking 13 includes an aperiodic system of scale graduation regions having different phase-shifting effects, and serves the purpose of generating a reference signal in at least one known reference position along the scale length. This makes it possible to produce an absolute reference for the high-resolution incremental scanning signals that result from scanning incremental graduation 12 in, e.g., a conventional manner. The specific manner in which the at least one reference signal is generated is irrelevant for the present discussion. Different variants of reference marking scanning may be used for this purpose.

Located on the side of scanning unit 20 is a light source 23, which is mounted on a carrier element and emits light in the direction of measuring standard 10. In the exemplary embodiment illustrated, no collimating optical elements are provided between light source 23 and measuring standard 10, i.e., light source 23, arranged as an LED, for example, radiates light in the direction of measuring standard 10 in divergent fashion.

This characteristic of the light source radiation results in an inhomogeneous but radially symmetrical intensity distribution in the detection plane of scanning unit 10. In the exemplary embodiment illustrated, light source 23 is arranged in a cavity 22.1 of a plate-like sensor component 22, which cavity will also be denoted as light-source cavity 22.1 in the following text. Light-source cavity 22.1 may be arranged either simply as a depression in sensor component 22 or else, as shown in FIG. 1, as complete opening or through-etching in sensor component 22, in the form of a truncated pyramid. Because of the etching along the crystal planes that took place in sensor component 22, a square cross-section of light-source cavity 22.1 comes about in the detection plane. On the upper face of sensor component 22.1, around the square through-etching of light source cavity 22.1 or around light source 23, a guard diode 22.2 which surrounds light-source cavity 22.1 without a gap, is situated in the detection plane. Via guard diode 22.2, charge carriers possibly generated there are extracted, which prevents cross-talk noise on adjacent detector system 27 which may cause a lower modulation degree of the scanning signals generated via this route.

Located on the upper side of sensor component 22, oriented toward measuring standard 10, perpendicular to measuring direction x, i.e., in the indicated y-direction and adjacent to light source cavity 22.1 in the detection plane, is a detector system 27 for scanning incremental graduation 12 on the one hand, and a reference marking detector 28 for scanning reference marking 13 on the other. The latter is illustrated only schematically in FIG. 3.

Detector system 27 for scanning incremental graduation 12 includes a multitude of individual optoelectronic detector elements 27.1 to 27.4, which are connected to each other in groups in electrically conductive manner. The particular detector elements 27.1 to 27.4 of a group that detect in-phase scanning signals in the scanned fringe pattern are interconnected. In the exemplary embodiment illustrated, detector system 27 has a semicircular design and includes a plurality of tracks, which are disposed concentrically about light source 23 and include detector elements 27.1 to 27.4. For further details with regard to the design of detector system 27 reference is made to the following description. In this context it should be mentioned that, due to the square cross-section of light source cavity 22.1, the geometric design of the innermost track of detector system 27 deviates from the geometric design of the track that is located next to it in the radial direction, as should be understood from the Figures. The number of detector elements in this track corresponds to the number in the other tracks. Only the angular width of the detector elements is reduced, and the center position of individual detector elements is modified so that sufficient space is available for square light-source cavity 22.1 and circumferential guard diode 22.2. This deviating arrangement of the innermost track is chosen in order to combine light-source cavity 22.1 and detector system 27 as effectively as possible. This makes it possible to scan the fringe pattern produced in the immediate vicinity of the guard diode as well. Due to the divergent illumination by light source 23, the highest intensity results in this region.

Situated above sensor component 22 in scanning unit 10, i.e., oriented in the direction of measuring standard 10, is a scanning plate 24 in the form of a transparent glass plate. On the side facing sensor component 22, scanning plate 24 has a transmitting grating 26 in the central region above light-source cavity 22.1. Transmitting grating 26 is arranged as a transmitted light amplitude grating, which has transparent and opaque scale-division regions periodically disposed in measuring direction x. In the following text, the scale-division period of transmitting grating 26 will be denoted by $TP_S$. In addition, scanning plate 24 carries, in this example on the same side, gratings in the form of periodic diaphragm structures 29 in the region above detector system 27, which act as detection grating for the scanning principle used in the case at hand. As far as the specific design of detector system 27 and also the periodic diaphragm structures 29 and the detection gratings are concerned, reference is made to the additional description. A portion of schematically indicated housing 25 of scanning unit 20 is illustrated in FIGS. 1 and 3.

Before addressing the design of detector system 27 for the incremental scanning in greater detail in the following text, the beam path for generating the incremental scanning signals will be discussed first.

The bundles of rays divergently emitted by light source 23 first pass through transmitting grating 26, then impinge on incremental graduation 12 on measuring standard 10, from which they are reflected again in the direction of scanning unit 20. A periodic fringe pattern having a stripe period that corresponds to the periodicity of diaphragm structures 29 results in the detection plane. The periodic fringe pattern is scanned and recorded with the aid of diaphragm structures 29 and detector system 27 and converted into a plurality of position-dependent, phase-shifted scanning signals when measuring standard 10 and scanning unit 20 execute a movement in relation to each other.

In the following text, the associated theoretical considerations with regard to the specific arrangement of detector system 27 for the incremental scanning, and periodic diaphragm structures 29 disposed upstream therefrom will be described first.

In this context, it is assumed that corresponding detector system 27 for scanning the periodic fringe pattern resulting in the detection plane includes a multitude of individual detector elements. The detector elements are combined into a plurality of groups, and the detector elements of a group supply in-phase scanning signals in each case. Different groups generate scanning signals that have different phase relations. Typically, approximately N=4 groups are provided, via which four scanning signals which have an individual 90° phase offset are able to be generated.

It is considered advantageous if the following dimensioning criteria i) to iv) are satisfied for such a detector system 27:

i) The sum of the areas of the detector elements of one group is identical to the sum of the areas of the detector elements of each other group.

ii) The centroid of the detector elements of one group is identical to the centroid of the detector elements of each other group.

iii) Furthermore, it is considered advantageous if the different groups of detector elements also have identical components of the second area sensitivity moment.

iv) In addition, the detector system is optimized even further if the different groups of detector elements also have identical values of further area sensitivity moments.

These conditions for the detector system are able to be represented in mathematical terms as follows:

It is assumed that $$S_i(x, y) \begin{cases} S_0(R) \\ 0 \end{cases}$$

in the area of the light-sensitive detector regions of phase i otherwise $S_0(R)$ is the light sensitivity (sensitivity) of the detector element surfaces, with i=1, 2, . . . , N and $$R = \sqrt{x^2 + y^2}$$

in which N=the number of signal phases.

The photocurrent generated by all light-sensitive detector element surfaces that are part of a phase results at $$IPh_i \int^A S_i(x, y) \cdot I(x, y) \cdot MG(x, y) dA$$

in which I(x,y) represents the average illumination intensity at the location (x,y), and MG(x,y) represents the local modulation degree of the intensity fringe pattern at the location (x,y).

The photocurrent of each phase should be identical.

If one then assumes that light sensitivity $S_0(R)$ is the same for all detector element surfaces and that the detector elements are uniformly distributed in the radial direction, then $F_i$ of the light-sensitive detector element surfaces that are part of a phase may be considered in simplified manner. This area $F_i$ results for:

$$F_i = \int^A S_i(x, y) dA$$

in which $$S_i(x, y) \begin{cases} S_0(R) \\ 0 \end{cases}$$

in the region of the photo elements belonging to i otherwise

The goal consists of achieving surface equality for the detector elements of the different phases, i.e., $$F_1 = F_2 = \ldots = F_N$$

The coordinates $xS_i$, $yS_i$ of the centroid of the surfaces of the detector elements that belong to a phase are defined by:

$$xS_i = \frac{1}{F_i} \int^A x \cdot S_i(x, y) dA$$

$$yS_i = \frac{1}{F_i} \int^A y \cdot S_i(x, y) dA$$

Ideally, the coordinates of the centroids of the detector elements of one group are identical to the centroids of the detector elements of each other group.

$$xS_1 = xS_2 = \ldots = xS_N$$

$$yS_1 = yS_2 = \ldots = yS_N$$

The independent components of the second area sensitivity moment are defined by:

$$Qxx_i = \int^A (3x^2 - (x^2 + y^2)) \cdot S_i(x, y) dA$$

$$Qyy_i = \int^A (3y^2 - (x^2 + y^2)) \cdot S_i(x, y) dA$$

$$Qxy_i = \int^A (3xy) \cdot S_i(x, y) dA$$

As mentioned above, the detector system is able to be improved even further if the area sensitivity moments of the second moment are the same for each signal phase.

$$Qxx_1 = Qxx_2 = \ldots = Qxx_N$$

$$Qyy_1 = Qyy_2 = \ldots = Qyy_N$$

$$Qxy_1 = Qxy_2 = \ldots = Qxy_N$$

The independent components of the third area sensitivity moment are defined by:

$$Oxxx_i = \int^A (5x^3 - 3x(x^2 + y^2)) \cdot S_i(x, y) dA$$

$$Oyyy_i = \int^A (5y^3 - 3y(x^2 + y^2)) \cdot S_i(x, y) dA$$

$$Oxxy_i = \int^A (5x^2 y - y(x^2 + y^2)) \cdot S_i(x, y) dA$$

$$Oxyy_i = \int^A (5xy^2 - x(x^2 + y^2)) \cdot S_i(x, y) dA$$

The components of the third area sensitivity moment may also be identical for each signal phase:

$$Oxxx_1 = Oxxx_2 = \ldots = Oxxx_N$$

$$Oyyy_1 = Oyyy_2 = \ldots = Oyyy_N$$

$$Oxxy_1 = Oxxy_2 = \ldots = Oxxy_N$$

$$Oxyy_1 = Oxyy_2 = \ldots = Oxyy_N$$

In the ideal case, the detector system is finally arranged such that additional higher area sensitivity moments are also identical for each signal phase.

Figure 4:
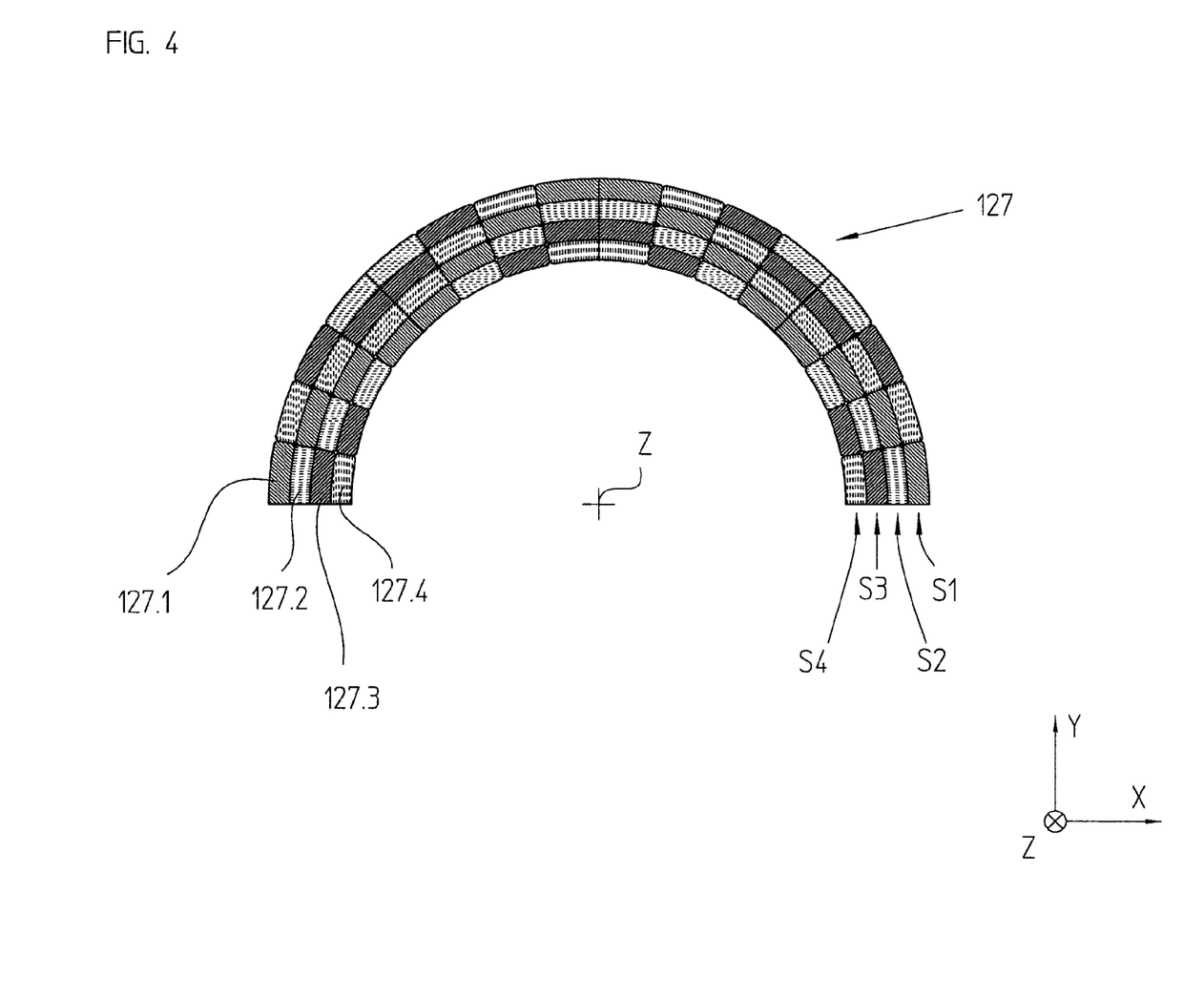
FIG. 4 schematically illustrates the configuration of the detector system.

Detector system 27 shown in FIG. 3 basically satisfies the aforementioned dimensioning criteria i) to iii). An even further optimization would result if dimensioning criterion iv) would be satisfied as well. A minimal configuration of a detector system 127 that satisfies dimensioning criteria i) to iii) is shown in FIG. 4. The different dimensioning criteria are illustrated in the following text with the aid of an exemplary embodiment based on detector system 127.

Similar to the exemplary embodiment of FIG. 3, the example of FIG. 4 once again provides a sector-shaped design for detector system 127. The light source is arranged inside the scanning unit, in center Z of the corresponding full circle. Such a sector-shaped arrangement of the detector system is considered advantageous especially for optical position-measuring devices in which a reference marking situated adjacent to the incremental graduation is scanned in addition to an incremental graduation on the measuring standard, as shown in the exemplary embodiment of FIG. 2, for example. In this manner, a reference marking detector (also not shown in FIG. 4) may be situated in the detector plane inside the scanning unit, at a distance from detector system 127 in the y-direction.

In the example embodiment illustrated in FIG. 4, the detector system includes a multitude of detector elements 127.1 to 127.4, which are disposed in four tracks S1 to S4 around a center Z in concentric semicircular form. Sixteen detector elements 127.1 to 127.4 in the shape of a sector are provided for each track S1 to S4. The particular detector elements 127.1 to 127.4 that are part of a group and therefore detect in-phase scanning signals, are shown in identical form. The detector elements of a first group are denoted by reference numeral 127.1, the detector elements of a second group are denoted by reference numeral 127.2, the detector elements of a third group are denoted by reference numeral 127.3, and the detector elements of a fourth group are denoted by reference numeral 127.4. As illustrated in FIG. 4, four detector elements 127.1 to 127.4 from each group are situated per track S1 to S4 in detector system 127; the areas of detector elements 127.1 to 127.4 within a track have been selected to be identical.

This configuration of detector system 127 consequently satisfies the above discussed dimensioning criterion i). In other words, the sum of the areas of detector elements 127.1 to 127.4 of one group is identical to the sum of the areas of detector elements 127.1 to 127.4 of each other group.

In order to satisfy the mentioned dimensioning criterion ii) with regard to the centroid locations of detector elements 127.1 to 127.4 of the different groups, a particular placement of detector elements 127.1 to 127.4 of the different groups is provided within detector system 127. This placement is selected such that a common centroid S of the detector elements results at the indicated location in the detector plane.

In the illustrated exemplary embodiment of a detector system for the optical position-measuring system, dimensioning criterion iii) is satisfied as well. This means that the different groups of detector elements additionally have identical values for the three components of the second area sensitivity moment.

Figure 5:
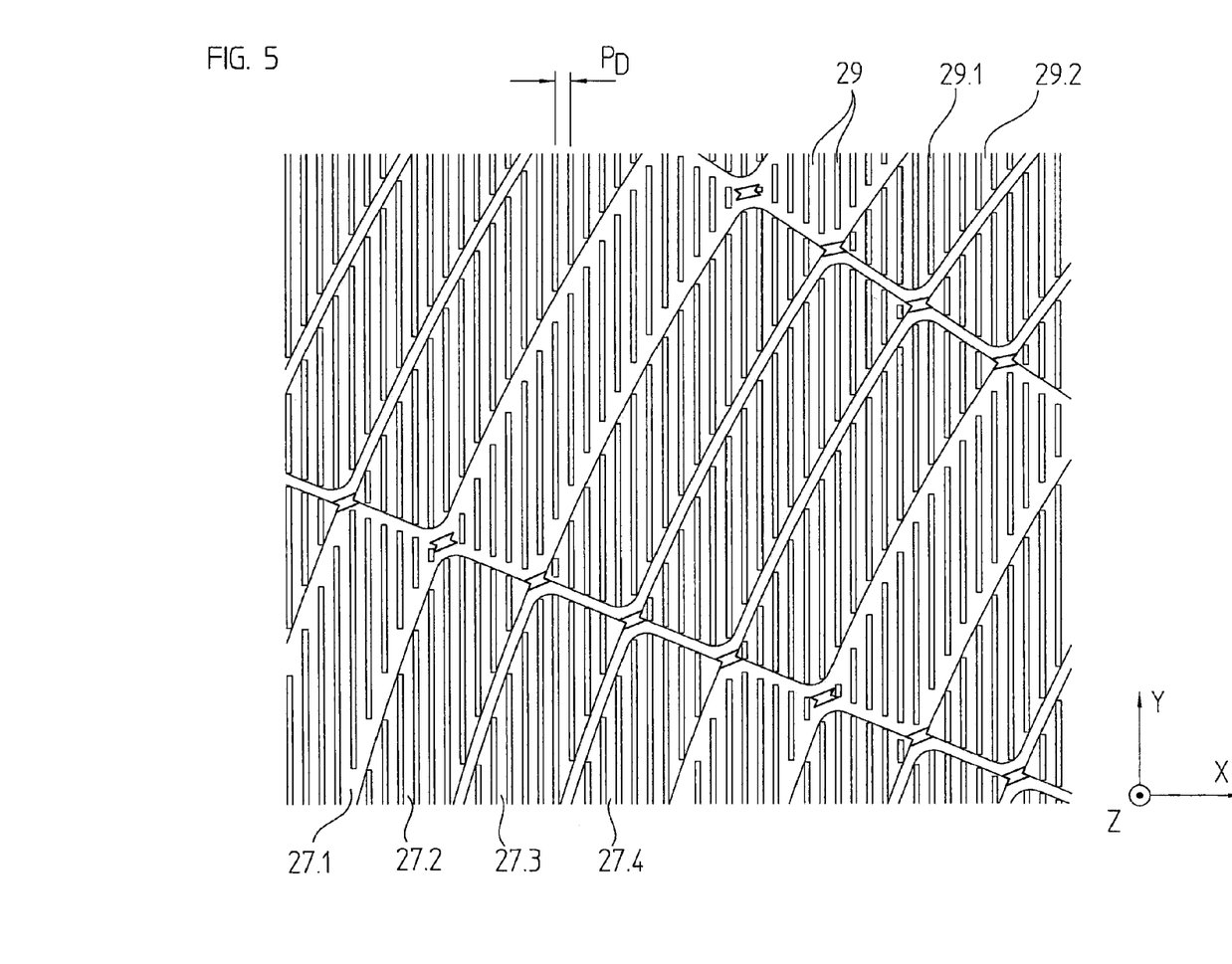
FIG. 5 is a partial view of the detector system illustrated in FIG. 3, including diaphragm structures.

FIG. 5 shows a partial view of the detector system illustrated in FIG. 3. In addition to detector elements 27.1 to 27.4 for the different phases of the scanning signals generated thereby, periodic diaphragm structures 29, which are placed in front of the light-sensitive areas of detector elements 27.1 to 27.4 in the scanning beam path, are shown as well. In the exemplary embodiment illustrated in FIGS. 1 to 3, diaphragm structures 29 are provided as grating on the underside of scanning plate 24, as mentioned earlier already. They include transparent regions 29.1 and opaque regions 29.2 disposed in alternation in measuring direction x. In FIG. 5, the narrow rectangular regions constitute transparent regions 29.1, which are periodically disposed along measuring direction x at a periodicity $P_D$. Periodicity $P_D$ with regard to the placement of transparent regions 29.1 of diaphragm structures 29 is lower than the dimension of individual detector elements 27.1 to 27.4 in measuring direction x. The remaining regions 29.2 of diaphragm structures 29 are opaque.

Transparent regions 29.1 of diaphragm structures 29 typically have a width d in measuring direction x according to the relationship $d=1/2 \cdot P_D$, or else $d=1/3 \; P \cdot P_D$, $P_D$ representing the periodicity of the transparent regions of the diaphragm structures. The second variant, i.e., a width $d=1/3 \cdot P_D$, furthermore allows excellent filtering of undesired third harmonics, which frequently are included in the fringe pattern.

As an alternative to placing the diaphragm structures on the underside of the scanning plate, the diaphragm structures may also be formed directly on the detector elements, in the form of a metallic layer that has appropriate transparent regions.

The optical position-measuring device may be optimized even further if the aforementioned dimensioning criteria i), ii) and possibly iii) are applied not only to the areas of detector elements 27.1 to 27.4 of detector system 27, but additionally also to diaphragm structures 29 disposed upstream from detector elements 27.1 to 27.4, that is to say, to transparent regions 29.1 of diaphragm structures 29, for example.

With regard to dimensioning criterion i), this means that the sum of the areas of transparent regions 29.1 of diaphragm structures 29 that are assigned to a group of detector elements 27.1 to 27.4 is identical to the sum of the areas of transparent regions 29.1 of diaphragm structures 29 that are assigned to each other group of detector elements 27.1 to 27.4.

With regard to dimensioning criterion ii), the arrangement of diaphragm structures 29 is such that the centroids of transparent regions 29.1 of diaphragm structures 29 that are assigned to a group of detector elements 27.1 to 27.4 are identical to the centroids of transparent regions 29.1 of diaphragm structures 29 that are assigned to each other group of detector elements 27.1 to 27.4.

Furthermore, the aforementioned dimensioning criterion iii) may additionally be applied to the configuration of diaphragm structures 29. Accordingly, it is provided that transparent regions 29.1 of diaphragm structures 29 assigned to different groups of detector elements 27.1 to 27.4 furthermore have identical values of the three components of the second area sensitivity moment.

It is also possible to optimize the diaphragm structures with regard to dimensioning criterion iv), to the effect that transparent regions 29.1 of diaphragm structures 29 assigned to different groups of detector elements 27.1 to 27.4 also have the same values of all further area sensitivity moments.

Figure 6:
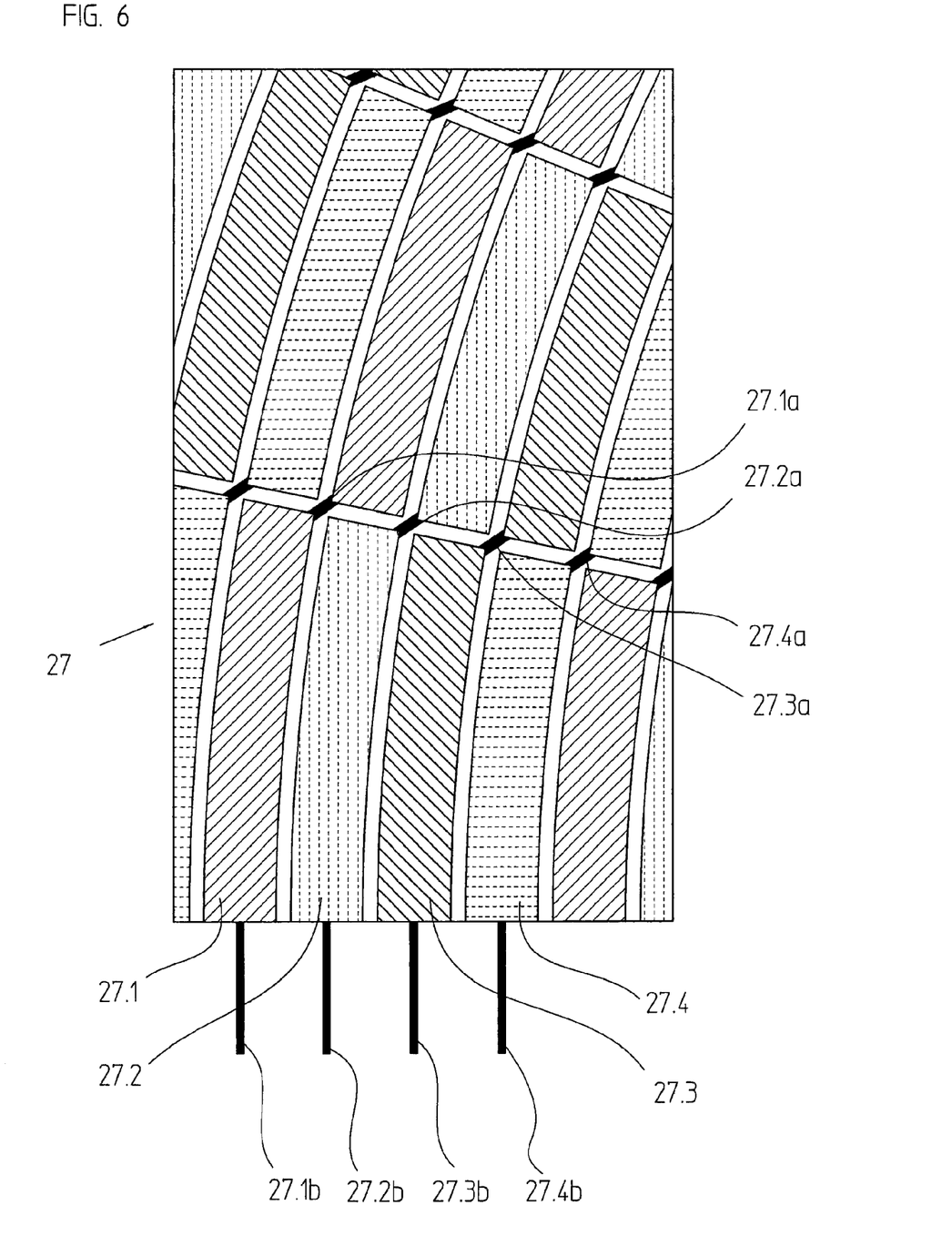
FIG. 6 is a partial view of the detector system illustrated in FIG. 3, without diaphragm structures.

FIG. 6 shows a partial view of detector system 27 illustrated in FIG. 3, more specifically, the region of detector system 27 at the left end of the semicircular system. Not shown in this figure are the diaphragm structures disposed upstream from detector elements 27.1 to 27.4. The manner in which the electrical contacting of detector elements 27.1 to 27.4 is implemented in detector system 27 of the optical position-measuring device is going to be explained with the aid of FIG. 6. For one, it is provided that detector elements 27.1 to 27.4 that belong to a common group are connected to each other in electrically conductive manner via contacting connections 27.1a to 27.4b. As illustrated in FIG. 6, contacting connections 27.1a to 27.4b in detector system 27 that include a plurality of concentric semicircular tracks provided with detector elements 27.1 to 27.4 extend diagonally from track to track. Contacting connections 27.1a to 27.4b are formed by suitably doped regions between detector elements 27.1 to 27.4 within sensor system 27. Detector system 27 therefore does not require any contacting connections arranged as metallic circuit tracks, possibly via detector elements 27.1 to 27.4, and thus would lead to disadvantageous shadowing and to signal interference by capacitive cross feed.

Moreover, FIG. 6 shows the manner in which detector elements 27.1 to 27.4 of the different groups are connected to downstream signal processing elements in electrically conductive manner. This is accomplished via contacting connections 27.1b to 27.4b, which connect detector elements 27.1 to 27.4 at the end edges of detector system 27, implemented in the form of a circle segment, to downstream signal processing elements.

A detector system 27 which is suitable for the optical position-measuring device, i.e., for a rotary position-measuring device, will be described with reference to FIG. 7.

If a rotary optical position-measuring device is involved, the scanned incremental graduation on the measuring standard has a conventional circular configuration or is arranged as a radial graduation on a graduated disk. In this case measuring direction x extends along the circumference, and the two objects that are movable relative to each other rotate about the circle axis.

In principle, detector system 27 shown in FIG. 3 may also be used for scanning a radial graduation. This requires no fundamental changes in the layout of detector system 27, i.e., it is arranged according to the afore-discussed dimensioning criteria. Only the design or placement of diaphragm structures 129 above the light-sensitive surfaces of the detector elements must be adapted for this application case. For instance, if the optical position-measuring device has a rotary design, then diaphragm structures 129 are placed only on a portion of the detector elements of detector system 27, according to a weighting function. As mentioned earlier already, diaphragm structures 129 may be implemented both as grating on the underside of a scanning plate, or as metallic layer having transparent regions on the detector elements.

Figure 7:
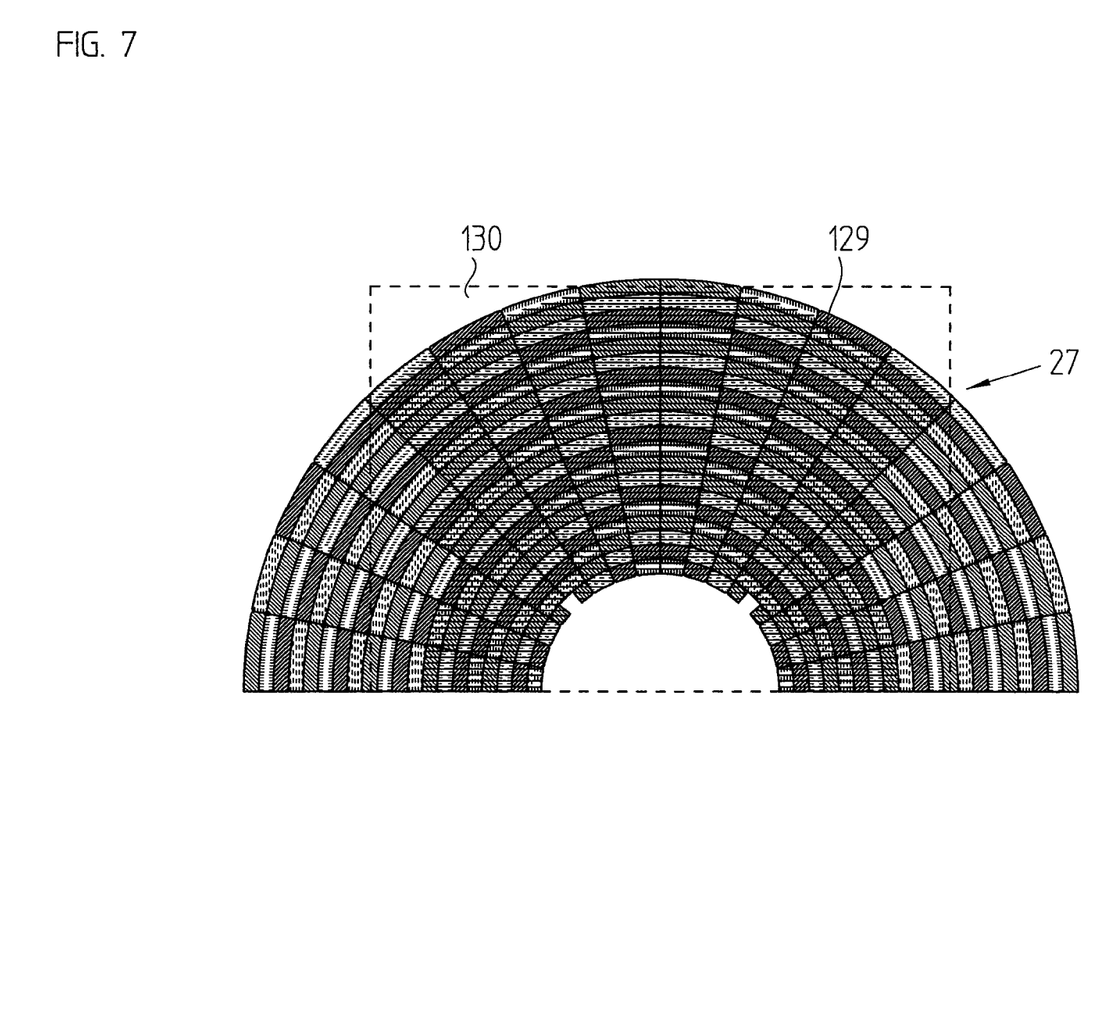
FIG. 7 is a partial view of a detector system which is suitable for the optical position-measuring device.

As illustrated in FIG. 7, in the illustrated example for a rotary application, diaphragm structures 129 are situated only on detector elements of detector system 27 that jointly form an approximately square region 130. Diaphragm structures 129 are illustrated schematically. Only the detector elements of detector system 27 that are situated in this square region 130 and have the upstream diaphragm structures 129 contribute to the signal generation. In addition, only diaphragm structures 129 provided in region 130 are arranged in accordance with the dimensioning criteria discussed above. In contrast to the afore-discussed linear measuring system, in the rotary case the transparent regions of the diaphragm structures are trapezoidal rather than rectangular.

Besides the exemplary embodiments described herein, other arrangements are possible.

For example, if no reference marking disposed adjacent to the incremental graduation is to be scanned, then it is possible to use a circular detector system in the optical position-measuring, provided the discussed dimensioning criteria for the detector system and possibly for the diaphragm structures are observed.

What is claimed is:

1. An optical position-measuring device for detecting a position of two objects which are movable relative to one another along at least one measuring direction, comprising:
    a measuring standard connected to one of the two objects and including an incremental graduation extending in the measuring direction; and
    a scanning unit connected to the other one of the two objects and including a light source, at least one grating, and a detector system;
    wherein the detector system includes a plurality of groups of detector elements arranged in a detection plane adapted to generate, in response to a relative movement of the two objects, a plurality of position-dependent, phase-shifted scanning signals by scanning a periodic fringe pattern resulting in the detection plane, each group of detector elements including detector elements that have in-phase scanning signals;
    wherein a sum of areas of the detector elements of a group is identical to the sum of the areas of the detector elements of each other group;
    wherein a centroid of the detector elements of a group is identical to the centroid of the detector elements of each other group; and
    wherein periodic diaphragm structures are arranged in front of a light-sensitive region of the detector elements.

2. The optical position-measuring device according to claim 1, wherein the periodic diaphragm structures include transparent and opaque regions disposed in alternation in at least the measuring direction, a periodicity of the periodic diaphragm structures being smaller than dimensions of the detector elements in the measuring direction.

3. The optical position-measuring device according to claim 2, wherein a sum of areas of the transparent regions of the diaphragm structures that are assigned to a group of detector elements is identical to the sum of the areas of the transparent regions of the diaphragm structures that are assigned to each other group of detector elements, and centroids of the transparent regions of the diaphragm structures that are assigned to a group of detector elements are identical to the centroids of the transparent regions of the diaphragm structures that are assigned to each other group of detector elements.

4. The optical position-measuring device according to claim 3, wherein different groups of detector elements have identical values of the three components of a second area sensitivity moment, and the transparent regions of the diaphragm structures that are assigned to different groups of detector elements have identical values of the three components of the second area sensitivity moment.

5. The optical position-measuring device according to claim 4, wherein the different groups of detector elements have identical values of all additional area sensitivity moments, and the transparent regions of the diaphragm structures that are assigned to different groups of detector elements have identical values of all additional area sensitivity moments.

6. The optical position-measuring device according to claim 1, wherein (a) the diaphragm structures are arranged as gratings on a scanning plate, and the scanning plate is located above the detector system in the scanning unit, or (b) the diaphragm structures are arranged as a metallic layer having transparent regions on the detector elements.

7. The optical position-measuring device according to claim 1, wherein dimension of the diaphragm structures in the measuring direction satisfies:
    (a) $d = 1/2 \cdot P_D$ or (b) $d = 1/3 \cdot P_D$, d representing a width of the diaphragm structures in the measuring direction x, and $P_D$ representing a periodicity of the transparent regions of the diaphragm structures.

8. The optical position-measuring device according to claim 1, wherein the diaphragm structures are arranged only on a portion of the detector elements according to a weighting function.

9. The optical position-measuring device according to claim 8, wherein the diaphragm structures are arranged only on detector elements of the detector system that jointly form an approximately square region.

10. The optical position-measuring device according to claim 1, wherein the detector system is arranged in the form of a circle segment and includes a plurality of circle sectors, a plurality of detector elements being disposed in a plurality of circular tracks radially adjacent to each other.

11. The optical position-measuring device according to claim 10, wherein the detector system has a semicircular configuration.

12. The optical position-measuring device according to claim 10, wherein the detector elements of adjacent tracks that generate in-phase scanning signals are electrically connected to each other via diagonally extending contacting connections.

13. The optical position-measuring device according to claim 10, wherein the detector elements of a group are connected at end edges of the detector systems arranged in the form of circle segments, to downstream signal-processing elements via contacting connections.

14. The optical position-measuring device according to claim 10, wherein the detector system is arranged next to the light source in the scanning unit and a guard diode, which surrounds the light source without a gap, is arranged in the detection plane.

15. The optical position-measuring device according to claim 10, wherein a geometrical configuration of a radially innermost track of the detector elements deviates from a geometrical configuration of a track that is located next to the radially innermost track in the radial direction.

* * * * *